Nov. 17, 1953

S. P. ROBINSON 2,659,453

SEPARATION OF ACETYLENE FROM GASEOUS
MIXTURES BY GLYCOLONITRILE

Filed Dec. 20, 1948

INVENTOR.
S. P. ROBINSON

BY Hudson & Young

ATTORNEYS

Patented Nov. 17, 1953

2,659,453

UNITED STATES PATENT OFFICE 2,659,453

SEPARATION OF ACETYLENE FROM GASEOUS MIXTURES BY GLYCOLONITRILE

Sam P. Robinson, Bartlesville, Okla., assignor to Phillips Petroleum Company, a corporation of Delaware Application December 20, 1948, Serial No. 66,403

13 Claims. (Cl. 183—115)

This invention relates to the separation of acetylene from gaseous mixtures containing this compound. In one of its more specific aspects, it relates to a process for the separation and recovery of acetylene from acetylene-containing gases wherein an aqueous solution of glycolonitrile ($HOCH_2CN$) is used as the selective solvent.

The process of this invention comprises contacting a gaseous mixture containing acetylene with glycolonitrile and subsequently separating the absorbed hydrocarbon from the absorption liquid. The contacting operation may be conducted under substantially atmospheric conditions of pressure and temperature, but preferably should be conducted under pressures greater than atmospheric pressure. The absorbed hydrocarbons may be separated from the solvent by stripping at lower pressures and/or higher temperatures than those employed in the contacting step, or by other known means such as contacting the rich glycolonitrile solution with a second solvent which is selective for either the hydrocarbon or the glycolonitrile.

An object of this invention is to provide a process for the separation and recovery of acetylene from gaseous mixtures containing this compound.

Another object of my invention is to provide a process for the extraction and recovery of acetylene from gaseous mixtures containing acetylene wherein a relatively small volume of absorbent is required.

Still other objects and advantages of my invention will be obvious to those skilled in the art upon reading the following specification.

Figure 1:
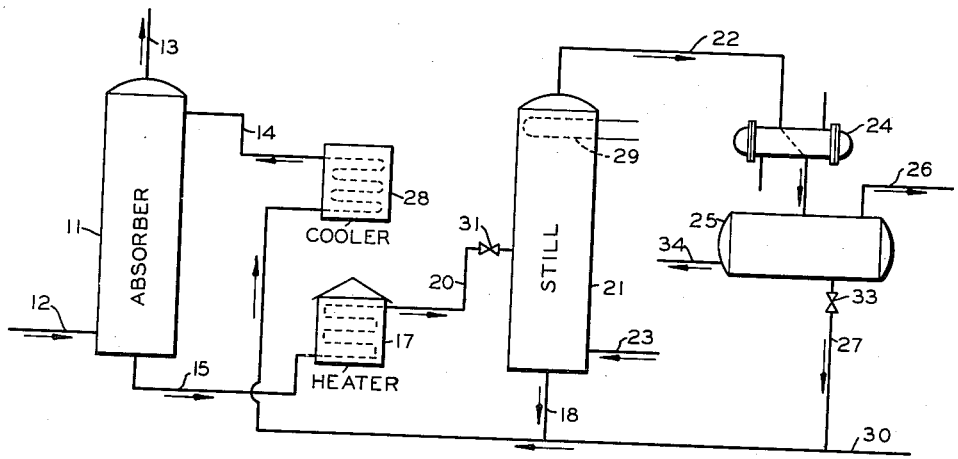
Figure 2:
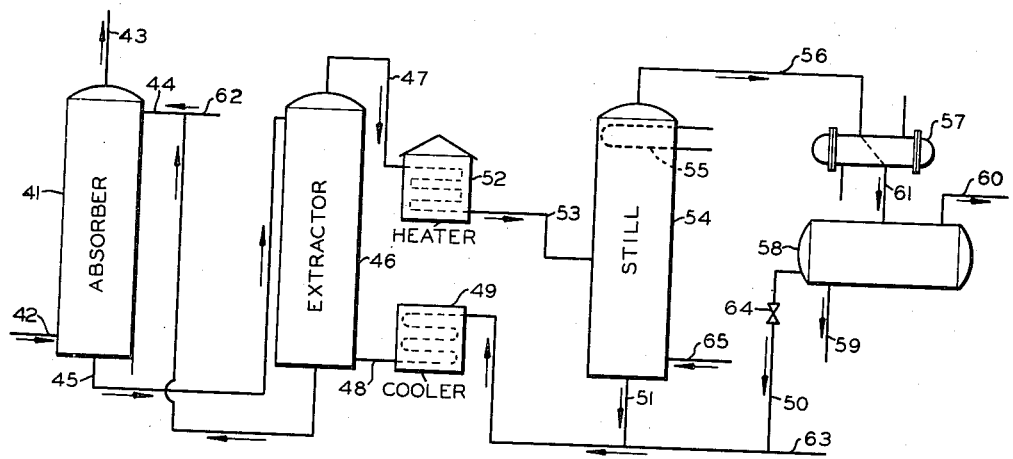

In the drawing, Figure 1 is a diagrammatic representation of one form of apparatus in which one embodiment of my invention may be practiced. Figure 2 is a diagrammatic representation of another form of apparatus in which a second embodiment of my invention may be practiced.

My invention comprises intimately contacting an acetylene-containing gas with a water solution of glycolonitrile under absorption conditions, then exposing the enriched absorbent to conditions under which the absorbed hydrocarbon is liberated or otherwise separated from the solvent. Such gases as refinery cracked gases, residue gases from various processes, or gases resulting from partial combustion of hydrocarbons and which contain acetylene are adaptable for treatment in my process with my novel absorbent. The aforementioned refinery cracked gases may result from cracking operations in which the normal gaseous compounds are not included in final gasoline boiling range products. Gases resulting from partial combustion of hydrocarbons may be such gases as are normally disposed of to the atmosphere, as, for example, in process for the production of carbon black by furnace methods. In such latter process, hydrocarbon charge stocks are ordinarily partially burned to supply sufficient heat for the conversion of the remainder of the hydrocarbons to carbon black, and under such partial combustion conditions appreciable quantities of acetylene and ethylene, along with gases normally produced by combustion, are formed. One of the main advantages of my process is that such gases as these may be treated for recovery of valuable acetylene.

In the operation of my process, such an unsaturated hydrocarbon-containing gas is contacted with an aqueous solution of glycolonitrile. This process may preferably be operated continuously and in such an operation the absorbent is introduced into a vertically disposed absorption tower at a point near its top, while the gas to be treated is introduced into the tower at a point near its bottom. Such gas-liquid contacting apparatus as baffles, slats or bubble trays and caps may be used for efficient contacting between the absorbent and the gas. Residue gas substantially free of acetylene is removed from the top of this absorption vessel and may be passed to such disposal as desired. In case the gas contains saturated hydrocarbons, such as methane or ethane, or other hydrocarbons, or even carbon monoxide and hydrogen, it still may be valuable as a source of fuel. The nitrile solution reaching the bottom of the contacting vessel is removed therefrom with its charge of dissolved gas and it is preferably passed into a heat exchanger or other heater for raising its temperature prior to introduction into a stripping vessel. This vessel is preferably maintained at a pressure below that of the contacting apparatus. For the stripping operation, the heated enriched nitrile is introduced into the top of the still or stripper vessel. The interior of this vessel may contain gas-liquid contacting equipment similar to that normally used in absorption vessels. When the nitrile solution reaches the bottom of this stripper vessel it is free or substantially free of absorbed hydrocarbon and the lean absorbent then may be cooled in a cooler or be passed in heat exchange relation with the rich absorbent. The cooled lean absorbent may preferably be further cooled to atmospheric or below atmospheric temperature, or to any desired temperature and then passed into the top of the absorption vessel to complete its cycle.

In the stripping operation, it is preferable to use a low boiling, normally liquid hydrocarbon as the stripping agent since the absorbed hydrocarbon is readily separated therefrom by a simple fractionation step. Steam may also be used as a stripping agent, preferably at subatmospheric pressure so as to minimize hydrolysis or decomposition of the glycolonitrile. It is preferable to operate the absorption step at a pressure greater than atmospheric pressure since at higher pressures less absorption liquid is required. If a high pressure is used in the aborption step the stripping operation may, if desired, consist merely of reducing the pressure on the rich absorbent under which condition absorbed gases are evolved from the solution. However, usually by mere reduction of pressure not all of the absorbed gases are removed and it is usually preferable to employ a stripping medium or to use other means of separation. In case the rich absorption liquid is heated for stripping of the absorbed hydrocarbon, and further, especially if open steam is used in the stripping step, water may be removed from or added to the nitrile solution. Hence, the concentration of nitrile in the absorption solution should be controlled by the operator.

Referring to the drawing, Figure 1 illustrates apparatus in which the above-described absorption-stripping operation using the solvent of my invention may be carried out. Absorber 11 is a conventional absorber into which is passed the acetylene containing feed stock through line 12. Residue gas leaves the absorber through an overhead line 13. Lean absorbent is introduced into the absorber through line 14 near the top of the vessel. Rich absorbent, aqueous glycolonitrile containing acetylene in solution, leaves the absorber through line 15, is heated in heater 17 and passes on through line 20 containing valve 31 into a still 21. Still 21 is a still of conventional design containing a reflux coil 29, a stripping gas inlet line 23, a bottoms outlet line 18 and an overhead line 22. Acetylene separated in this still from the absorbent passes through the overhead line 22 through a condenser 24 into an accumulator 25. Gaseous acetylene is passed from this accumulator through line 26 to any disposal desired. Water or aqueous nitrile solution in the recovered acetylene is condensed in condenser 24. Condensate is recycled from the accumulator 25 through line 27 containing valve 33, through a cooler 28 and line 14 into the absorber 11. Makeup water, glycolonitrile, or both these materials, may be added through line 30 as required. When steam is used as the stripping agent in still 21, as disclosed hereinabove, an excess of water may accumulate in accumulator 25 so that water may need to be withdrawn from the system through line 27, valve 33 and line 30. In case a low boiling normally liquid hydrocarbon is used as a stripping agent, as disclosed hereinabove, it is introduced into the still 21 through line 23. This hydrocarbon is condensed in condenser 24 and condensate accumulates in accumulator 25. This liquid hydrocarbon will then float as a separate layer upon the surface of any water in accumulator 25 and this normally liquid hydrocarbon is removed from the accumulator through line 34 and it is vaporized in a heater, not shown, and the vapor recycled into the still 21 through line 23 as mentioned. When the separation operation in the vessel 21 is carried out merely by reducing pressure on the rich absorbent, as mentioned, the rich absorbent is passed through line 15 from the absorber, through line 20 and the pressure reducing valve 31 into the vessel 21. In this case the heater 17 is omitted when the acetylene is removed from the absorbent in vessel 21 by pressure reduction alone. The operation is substantially one of flashing, and this type of operation for acetylene recovery is not preferred since, as mentioned above, the acetylene is not completely removed from the absorbent.

Other methods which may be used for separating and recovering the acetylene from the glycolonitrile solution include the use of secondary solvents for either the hydrocarbon or the nitrile. Thus the rich absorbent may be contacted with benzene in a second contacting zone, followed by separation into two liquid phases. The lower, aqueous phase contains the denuded glycolonitrile and may be recycled to the first contacting vessel for reuse in the process, while the upper, benzene-rich phase contains the unsaturated hydrocarbon which may then be recovered easily by fractional distillation. Alternatively, the rich absorbent may be treated with additional water, preferably at or near atmospheric pressure, to aid in releasing the absorbed hydrocarbons. The dilute glycolonitrile solution may then be reconcentrated to the desired concentration by distillation, and reused in the process. Obviously, other materials in which hydrocarbons are soluble and which are substantially immiscible with aqueous glycolonitrile may be substituted for benzene.

Figure 2 of the drawing represents the embodiment of my invention in which a secondary solvent, such as benzene, is used to separate the acetylene from the rich absorbent. According to this embodiment, the absorber 41 with its feed gas inlet line 42, overhead gas outlet line 43, lean absorbent inlet line 44 and rich absorbent outlet line 45 are exactly like the corresponding absorber apparatus parts in Figure 1. The aqueous glycolonitrile is introduced into the absorber 41 through line 44 and the rich absorbent is passed through line 45 into an extractor vessel 46. In this vessel, a secondary solvent, such as the hereinbefore mentioned benzene, is introduced through line 48. In this vessel the benzene extracts the acetylene from the aqueous glycolonitrile and the rich benzene is passed through line 47, heater 52, and line 53 into a still 54. This still may be operated in a conventional manner involving the use of stripping steam from pipe 63 and an overhead cooling coil 55. The separated acetylene is passed through line 56, cooler or condenser 57 and line 61 into an accumulator 58. Any water accumulating in this vessel may be withdrawn through line 59. Any benzene accumulating in vessel 58 is passed through line 50 containing valve 64, through cooler 49 and line 48 into the extractor vessel 46. Still bottoms consisting of secondary solvent is passed through line 51, cooler 49 and line 48 into the extractor. Makeup secondary solvent as required is added through line 63. The acetylene recovered from the secondary solvent accumulates as a gas in the accumulator 58 and is withdrawn therefrom through line 60 and is passed to such disposal as desired. Makeup aqueous glycolonitrile is added to the lean absorbent inlet line 44 through line 62 as required.

Glycolonitrile is useful in my process as an aqueous solution containing from about 30 to about 80 per cent, preferably about 50 per cent, water by weight. This nitrile solution is rendered stable by addition of sufficient non-volatile mineral acid to give the aqueous solution a pH of about 2½ to 3. Glycolonitrile boils at about 183° C. (759 mm.) with slight decomposition, but in an aqueous solution in the presence of acid it is relatively stable and is accordingly suitable for commercial operation. Thus glycolonitrile in the presence of acid may be used in the still at its boiling point.

I am aware of U. S. 1,882,978, issued October 18, 1932, to Otto Schmidt and Otto Grosskinsky, in which the compound lactonitrile (lactic acid nitrile, $CH_3CHOHCN$) is mentioned, along with numerous other organic compounds of various types, as a possible selective solvent for unsaturated hydrocarbons, particularly gaseous diolefins such as butadiene. The compound lactonitrile, however, is not well suited to the separation of acetylene from gaseous mixtures because of its relatively low capacity for acetylene per unit of weight of the nitrile, and lactonitrile has never achieved success commercially as a selective solvent for acetylene.

I have found, however, that aqueous glycolonitrile has a significantly higher capacity for acetylene than does lactonitrile and is eminently suited to the process of this invention by reason of its high selectivity for acetylene as compared with ethane, ethylene and other gases with which acetylene is usually found in admixture.

Furthermore, glycolonitrile or its aqueous solutions may be used to advantage for the recovery of acetylene from gas streams in which the acetylene is present in very low concentrations. The recovery of acetylene from such streams by means of the more volatile conventional solvents (such as acetone) results in prohibitive losses of solvent in the overhead gases. This is not the case with either glycolonitrile or its aqueous solutions. Also, the concentrated aqueous solutions of glycolonitrile, or the anhydrous material, may be used to advantage at low temperatures because of their low freezing points.

The following tabulation gives some properties of glycolonitrile:

| | |
|---|---|
| Density | 1.104 at 19° C. |
| Melting point | Below −72° C. |
| Boiling point | 183° C. (slight decomposition). |
| Solubility in water | Very soluble. |
| Solubility in alcohol | Very soluble. |
| Solubility in ether | Very soluble. |
| Solubility in benzene | Insoluble. |

The example given below shows the relative capacities, for acetylene, of aqueous solutions of glycolonitrile and lactonitrile. It also shows the high selectivity of glycolonitrile for acetylene as compared with ethane. The concentrations of the aqueous nitrile solutions are in per cent by weight in each case.

| | Glycolonitrile pH=2.8 ($H_3PO_4$) | Lactonitrile pH=2.6 ($H_3PO_4$) |
|---|---|---|
| Acetylene: | | |
| Volume of Liquid Sample, cc. | 8.5 | 8.0 |
| Volume Gas Dissolved at 25° C. 747 mm., cc. | 18.3 | 13.8 |
| (cc. Gas/cc. liquid, gas at NTP) | 1.93 | 1.56 |
| Ethane: | | |
| Volume of Liquid Sample, cc. | 8.0 | 8.0 |
| Vol. Gas dissolved at 25° C. 747 mm., cc. | 0.3 | 0.3 |
| (cc. Gas/cc. liquid, gas at NTP) | 0.03 | 0.03 |

The lactonitrile solution used in these tests contained sufficient phosphoric acid to give a pH of 2.6, while the glycolonitrile solution contained sufficient phosphoric acid to give the solution a pH of 2.8. From the data of these tests, it is seen that the glycolonitrile dissolved 1.93 cc. of acetylene per cc. of absorbent liquid in contrast to only 1.56 cc. of acetylene per cc. of the lactonitrile solution. Thus, roughly speaking, about one-fourth less glycolonitrile solution by volume or by weight is required for absorbing a given amount of acetylene than when using the lactonitrile solution. This greater absorption of acetylene in the absorbent solution has many commercial advantages as, for example, less absorption solution is required for a given acetylene production, the equipment is smaller, hence its cost in regard to purchase or construction is less, and further, operation costs are smaller since smaller volumes of absorption liquid need be pumped from the absorption vessel to the stripping vessel and from the stripping vessel back to the absorption vessel.

From the solubility data of ethane in the glycolonitrile solution, it is seen that a substantially ethane-free acetylene product may be produced in a multi-stage separation system using my aqueous glycolonitrile solution. Ethylene, while more soluble in my solvent than is ethane, may also be substantially completely removed from acetylene by my process since it is much less soluble than acetylene.

It will be obvious to those skilled in the art that many variations and alterations in my process may be made and yet remain within the intended scope of my invention.

Having disclosed my invention, I claim:

1. A method for separating acetylene from admixture with gases with which acetylene is normally produced comprising contacting said admixture of gases with a reagent comprising an aqueous solution of glycolonitrile acidified with a nonvolatile mineral acid to a pH of 2½ to 3, separating the resulting solution from the gases and recovering acetylene from said resulting solution.

2. A method for separating acetylene from admixture with gases with which acetylene normally occurs comprising contacting said admixture of gases with an aqueous solution of glycolonitrile acidified with a nonvolatile mineral acid to a pH of 2½ to 3, separating the resulting solution from the remaining gases and recovering the acetylene from said resulting solution.

3. A method for separating acetylene from admixture with gaseous hydrocarbons and recovering the acetylene in concentrated form which comprises intimately contacting the hydrocarbon mixture with a reagent comprising an aqueous solution of glycolonitrile acidified with a nonvolatile mineral acid to a pH of 2½ to 3 at atmospheric temperature and under a superatmospheric pressure, separating the resulting acetylene-containing solution from undissolved gaseous hydrocarbons, exposing said separated solution to conditions of heat and reduced pressure and recovering the acetylene.

4. A method for separating acetylene from partial combustion products comprising acetylene, nitrogen, carbon monoxide, carbon dioxide, methane, ethylene and ethane, comprising contacting said partial combustion products continuously and in countercurrent relation to a stream of an aqueous solution of glycolonitrile having a pH in the range of 2½ to 3 under superatmospheric pressure, exposing said contacted stream of aqueous glycolonitrile continuously to stripping conditions of pressure lower than said superatmospheric pressure and at a temperature of the boiling point of said aqueous glycolonitrile solution, separating acetylene containing moisture from said stripping operation and recovering the actylene as the product of the process.

5. The method of claim 4 wherein the acetylene is dried of its moisture content and dry acetylene is recovered as the product of the process.

6. The method of claim 4 wherein the aqueous solution of glycolonitrile has a water content between the limits of 30% and 80% by weight.

7. The method of claim 4 wherein the aqueous solution of glycolonitrile has a water content of 50% by weight.

8. A method for separating acetylene from admixture with other gases comprising intimately contacting the gaseous mixture with an aqueous solution of glycolonitrile, separating the contacted gaseous mixture from said aqueous solution, contacting the separated aqueous solution with benzene and recovering the actylene from the benzene.

9. A method for separating acetylene from admixture with other gases comprising intimately contacting the gaseous mixture with an aqueous solution of glycolonitrile, separating the contacted gaseous mixture from the aqueous solution, contacting the separated aqueous solution with benzene, separating the contacted benzene from the aqueous solution, distilling acetylene from the separated benzene as the main product of the process.

10. A method for separating acetylene from admixture with other gases comprising intimately contacting the gaseous mixture with an aqueous solution of glycolonitrile at a superatmospheric pressure and at atmospheric temperature, separating the contacted gaseous mixture from the aqueous solution, contacting the separated aqueous solution with benzene at atmospheric temperature, separating the contacted benzene from said aqueous solution, distilling the acetylene from the separated benzene, recovering the distilled acetylene as the main product of the process, and reusing the last mentioned aqueous solution and benzene as the first mentioned aqueous solution and benzene, respectively.

11. A method for separating acetylene from admixture with other gases comprising intimately contacting the gaseous mixture with an aqueous solution of glycolonitrile acidified with a non-volatile mineral acid to a pH of 2½ to 3, separating the contacted gaseous mixture from said aqueous solution, contacting the separated aqueous solution with benzene and recovering the acetylene from the benzene.

12. A method for separating acetylene from admixture with other gases comprising intimately contacting the gaseous mixture with an aqueous solution of glycolonitrile acidified with a non-volatile mineral acid to a pH of 2½ to 3, separating the contacted gaseous mixture from the aqueous solution, contacting the separated aqueous solution with benzene, separating the contacted benzene from the aqueous solution, distilling acetylene from the separated benzene as the main product of the process.

13. A method for separating acetylene from admixture with other gases comprising intimately contacting the gaseous mixture with an aqueous solution of glycolonitrile acidified with phosphoric acid to a pH of 2½ to 3 at a superatmospheric pressure and at atmospheric temperature, separating the contacted gaseous mixture from the aqueous solution, contacting the separated aqueous solution with benzene at atmospheric temperature, separating the contacted benzene from said aqueous solution, distilling the acetylene from the separated benzene, recovering the distilled acetylene as the main product of the process, and reusing the last mentioned aqueous solution and benzene as the first mentioned aqueous solution and benzene, respectively.

SAM P. ROBINSON.

References Cited in the file of this patent

UNITED STATES PATENTS

| Number | Name | Date |
| --- | --- | --- |
| 1,882,978 | Schmidt et al. | Oct. 18, 1932 |
| 1,946,489 | De Jahn | Feb. 13, 1934 |
| 1,965,100 | Groll et al. | July 3, 1934 |
| 2,217,429 | Balcar | Oct. 8, 1940 |
| 2,371,908 | Morris et al. | Mar. 20, 1945 |

FOREIGN PATENTS

| Number | Country | Date |
| --- | --- | --- |
| 331,610 | Great Britain | July 10, 1930 |
| 400,054 | Great Britain | Oct. 19, 1933 |
| 548,733 | Great Britain | Oct. 22, 1942 |
| 608,091 | Great Britain | Sept. 9, 1948 |